(12) United States Patent
Schnell (10) Patent No.: US 9,245,127 B2
(45) Date of Patent: Jan. 26, 2016

(54) SEGMENTED MEDIA CONTENT RIGHTS MANAGEMENT

(71) Applicant: Microsoft Technology Licensing, LLC, Redmond, WA (US)

(72) Inventor: Patrik Schnell, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/776,581

(22) Filed: Feb. 25, 2013

(65) Prior Publication Data

US 2013/0212695 A1 Aug. 15, 2013

Related U.S. Application Data

(63) Continuation of application No. 12/163,991, filed on Jun. 27, 2008, now Pat. No. 8,387,150.

(51) Int. Cl.
| | |
|---|---|
| G06F 21/60 | (2013.01) |
| G06F 21/10 | (2013.01) |
| H04N 21/2662 | (2011.01) |
| H04N 21/418 | (2011.01) |
| H04N 21/436 | (2011.01) |
| H04N 21/4402 | (2011.01) |
| H04N 21/4627 | (2011.01) |
| H04N 21/8355 | (2011.01) |
| H04N 21/845 | (2011.01) |
| H04N 21/854 | (2011.01) |
| H04L 29/06 | (2006.01) |

(52) U.S. Cl.
CPC ............... *G06F 21/60* (2013.01); *G06F 21/10* (2013.01); *H04L 29/06027* (2013.01); *H04N 21/2662* (2013.01); *H04N 21/4181* (2013.01); *H04N 21/43615* (2013.01); *H04N 21/44029* (2013.01); *H04N 21/4627* (2013.01); *H04N 21/8355* (2013.01); *H04N 21/8456* (2013.01); *H04N 21/85406* (2013.01)

(58) Field of Classification Search
USPC .......................................................... 726/26
See application file for complete search history.

(56) References Cited

U.S. PATENT DOCUMENTS

| | | | | |
|---|---|---|---|---|
| 5,319,453 | A | * | 6/1994 | Copriviza et al. ............... 346/6 |
| 6,437,834 | B1 | * | 8/2002 | Tagami ........................ 348/705 |
| 7,017,177 | B1 | | 3/2006 | Funakoshi |

(Continued)

OTHER PUBLICATIONS

"Foreign Office Action", Chinese Application No. 200980124703.2, (Feb. 26, 2013), 12 pages.

(Continued)

*Primary Examiner* — Michael R Vaughan
(74) *Attorney, Agent, or Firm* — Dan Choi; Judy Yee; Micky Minhas (57) ABSTRACT

Segmented media content rights management is described. A media device can receive segments of protected media content from media content streams that each include a different version of the protected media content. A media content file can be generated to include the segments of the protected media content that are sequenced to render the protected media content for viewing. A file header object can be instantiated in a file header of the media content file, where the file header object includes DRM-associated features, such as one or more DRM licenses, properties, and/or attributes that correspond to the media content file to provision all of the segments of the protected media content together.

20 Claims, 4 Drawing Sheets

(56) References Cited

U.S. PATENT DOCUMENTS

| | | | |
|---|---|---|---|
| 7,174,568 B2 | 2/2007 | Chatani et al. | |
| 7,251,832 B2 | 7/2007 | Venters, III et al. | |
| 7,369,677 B2* | 5/2008 | Petrovic et al. | 382/100 |
| 7,412,061 B2 | 8/2008 | Peinado et al. | |
| 7,430,610 B2 | 9/2008 | Pace et al. | |
| 7,457,415 B2 | 11/2008 | Reitmeier et al. | |
| 7,548,653 B2 | 6/2009 | Olshansky et al. | |
| 7,581,255 B2 | 8/2009 | Alkove et al. | |
| 7,587,736 B2 | 9/2009 | Summers et al. | |
| 7,593,543 B1* | 9/2009 | Herz et al. | 382/100 |
| 7,613,182 B2 | 11/2009 | Lecomte et al. | |
| 7,627,886 B2* | 12/2009 | Barbanson et al. | 725/90 |
| 7,643,478 B2 | 1/2010 | Lecomte et al. | |
| 7,653,940 B2* | 1/2010 | Luo et al. | 726/22 |
| 7,664,856 B2 | 2/2010 | Bowra et al. | |
| 7,668,866 B2 | 2/2010 | Liu et al. | |
| 7,697,475 B2 | 4/2010 | Wendling et al. | |
| 7,774,281 B2 | 8/2010 | Okamoto et al. | |
| RE41,707 E | 9/2010 | Funakoshi | |
| 7,797,720 B2* | 9/2010 | Gopalakrishnan et al. | 725/88 |
| 7,801,305 B2 | 9/2010 | Lecomte et al. | |
| 7,801,306 B2 | 9/2010 | Reitmeier et al. | |
| 7,823,212 B2 | 10/2010 | Yamamichi et al. | |
| 7,853,532 B2 | 12/2010 | Nagao | |
| 7,874,015 B2 | 1/2011 | Aaron | |
| 7,886,073 B2 | 2/2011 | Gahm et al. | |
| 7,974,280 B2 | 7/2011 | Lecomte et al. | |
| 7,984,505 B2 | 7/2011 | Read | |
| 7,992,190 B2 | 8/2011 | Mevissen et al. | |
| 8,010,806 B2 | 8/2011 | Takashima et al. | |
| 8,015,310 B2 | 9/2011 | Gahm et al. | |
| 8,027,936 B2 | 9/2011 | Ito | |
| 8,055,785 B2 | 11/2011 | Liu et al. | |
| 8,055,900 B2 | 11/2011 | Iwamura et al. | |
| 8,059,696 B2* | 11/2011 | Dateki | 375/146 |
| 8,175,978 B2 | 5/2012 | Endoh | |
| 8,386,630 B1* | 2/2013 | Atzmon | 709/231 |
| 8,387,150 B2 | 2/2013 | Schnell | |
| 8,407,565 B2* | 3/2013 | Lee | 714/774 |
| 8,472,779 B2* | 6/2013 | Lee | 386/343 |
| 8,473,630 B1* | 6/2013 | Galligan | 709/231 |
| 8,539,543 B2* | 9/2013 | Schnell | G06F 21/10 726/1 |
| 2002/0112244 A1* | 8/2002 | Liou et al. | 725/93 |
| 2003/0126619 A1 | 7/2003 | Moon | |
| 2003/0195977 A1* | 10/2003 | Liu et al. | 709/231 |
| 2004/0022389 A1 | 2/2004 | Shen-Orr et al. | |
| 2004/0143760 A1 | 7/2004 | Alkove et al. | |
| 2005/0002525 A1* | 1/2005 | Alkove | H04L 29/06 380/37 |
| 2005/0097615 A1* | 5/2005 | Moradi et al. | 725/90 |
| 2005/0114672 A1 | 5/2005 | Duncan | |
| 2005/0119977 A1* | 6/2005 | Raciborski | G06F 21/105 705/59 |
| 2005/0144141 A1 | 6/2005 | Nagao | |
| 2005/0165849 A1* | 7/2005 | Moradi et al. | 707/104.1 |
| 2006/0010500 A1 | 1/2006 | Elazar et al. | |
| 2006/0075226 A1 | 4/2006 | Aksu et al. | |
| 2006/0129907 A1* | 6/2006 | Volk et al. | 715/500 |
| 2006/0129916 A1* | 6/2006 | Volk et al. | 715/513 |
| 2006/0129917 A1* | 6/2006 | Volk et al. | 715/513 |
| 2006/0179153 A1 | 8/2006 | Lee et al. | |
| 2007/0011344 A1 | 1/2007 | Paka | |
| 2007/0083476 A1 | 4/2007 | Gomes et al. | |
| 2007/0101394 A1* | 5/2007 | Fu et al. | 725/134 |
| 2007/0112680 A1 | 5/2007 | van Niekerk | |
| 2007/0156598 A1 | 7/2007 | Yoon et al. | |
| 2007/0204064 A1 | 8/2007 | Mail | |
| 2007/0233601 A1 | 10/2007 | Nakada | |
| 2007/0266446 A1 | 11/2007 | Aaron | |
| 2007/0274520 A1 | 11/2007 | Ogata | |
| 2008/0010653 A1 | 1/2008 | Ollikainen et al. | |
| 2008/0016581 A1 | 1/2008 | Cho | |
| 2008/0021959 A1 | 1/2008 | Naghi | |
| 2008/0034396 A1* | 2/2008 | Lev | 725/118 |
| 2008/0060085 A1 | 3/2008 | Samzelius et al. | |
| 2008/0115224 A1* | 5/2008 | Jogand-Coulomb | G06F 21/10 726/27 |
| 2008/0115225 A1* | 5/2008 | Jogand-Coulomb | G06F 21/79 726/27 |
| 2008/0144713 A1* | 6/2008 | Kimmich et al. | 375/240.02 |
| 2008/0255994 A1* | 10/2008 | Schnell | G06Q 30/02 705/52 |
| 2008/0267399 A1 | 10/2008 | Medvinsky et al. | |
| 2008/0270913 A1* | 10/2008 | Singer et al. | 715/748 |
| 2008/0271165 A1* | 10/2008 | Schnell | G06F 21/10 726/30 |
| 2008/0275886 A1* | 11/2008 | Caruso et al. | 707/10 |
| 2009/0003600 A1 | 1/2009 | Chen et al. | |
| 2009/0150961 A1 | 6/2009 | Kabuto et al. | |
| 2009/0245514 A1* | 10/2009 | Singer | 380/202 |
| 2009/0259633 A1* | 10/2009 | Bronstein et al. | 707/3 |
| 2009/0290709 A1 | 11/2009 | Macdonald et al. | |
| 2009/0319563 A1* | 12/2009 | Schnell | G06F 17/3002 1/1 |
| 2009/0328228 A1 | 12/2009 | Schnell | |
| 2009/0328237 A1 | 12/2009 | Rodriguez et al. | |
| 2010/0054712 A1 | 3/2010 | Wollmershauser et al. | |
| 2010/0058205 A1* | 3/2010 | Vakil et al. | 715/761 |
| 2010/0154065 A1 | 6/2010 | Cohen et al. | |
| 2010/0218232 A1 | 8/2010 | Rodriguez et al. | |
| 2010/0278271 A1* | 11/2010 | MacInnis | 375/240.18 |
| 2010/0332826 A1* | 12/2010 | Lin | 713/158 |
| 2011/0023072 A1* | 1/2011 | Hodzic et al. | 725/95 |
| 2011/0154426 A1 | 6/2011 | Doser et al. | |
| 2013/0055332 A1* | 2/2013 | Nishi | 725/131 |
| 2013/0160063 A1* | 6/2013 | Rashid | 725/109 |
| 2014/0082192 A1* | 3/2014 | Wei | 709/224 |

OTHER PUBLICATIONS

"Final Office Action", U.S. Appl. No. 12/163,991, (Jul. 27, 2012), 17 pages.

"Non-Final Office Action", U.S. Appl. No. 12/163,991, (Feb. 17, 2012), 15 pages.

"Notice of Allowance", U.S. Appl. No. 12/163,991, (Oct. 23, 2012), 8 pages.

"PCT Search Report and Written Opinion", Application No. PCT/US2009/048290, (Dec. 30, 2009), 11 pages.

Cheng, Jacqui "Microsoft Launches PlayReady Interoperable DRM Platform for Mobile Devices", Retrieved from: <http://arstechnica.com/news.ars/post/20070212-8816.html> on Apr. 1, 2008, (Feb. 12, 2007), 1 page.

Chu, C-C et al., "Mobile DRM for Multimedia Content in P2P Networks", Retrieved from: <http://ieeexplore.ieee.org/iel5/10599/33506/01593212.pdf?tp=&isnumber=&arnumber=1593212> on Apr. 1, 2008, 3rd Consumer Communications and Networking Conference, IEEE, vol. 2,(Jan. 8, 2006), pp. 1119-1123.

Hartung, Frank et al., "Digital Rights Management and Watermarking of Multimedia Content for M-Commerce Applications", *IEEE Communications Magazine*, Available at <http://ieeexplore.ieee.org/iel5/35/19115/00883493.pdf?tp=&isnumber=&armunber=1593212>,(Nov. 2004), pp. 78-84.

Kim, Gunhee et al., "Intellectual Property Management on MPEG-4 Video for Hand-Held Device and Mobile Streaming Service", *IEEE Transactions on Consumer Electronics*, vol. 51, Issue 1, Available at <http://ieeexplore.ieee.org/iel5/30/30482/014057711.pdf?tp=&isnumber-&arnumber=1405711>,(Feb. 2005), pp. 139-143.

Kim, Gunhee et al., "Mobile Multimedia Management DRM (Digital Rights Management) for Hand-Held Devices", *ICCE. 2005 Digest of Technical Papers*, Available at <http://ieeexplore.org/iel5/9776/30841/01429718.pdf?tp=&isnumber=&arnumber=1429718>,(Jan. 2005), pp. 63-64.

"Foreign Office Action", Japanese Application No. 2011-516529, Jul. 10, 2013, 8 Pages.

"Foreign Notice of Allowance", JP Application No. 2011-516529, Nov. 5, 2013, 4 Pages.

\* cited by examiner

SEGMENTED MEDIA CONTENT RIGHTS MANAGEMENT

RELATED APPLICATIONS

This application is a continuation of, and claims priority to, U.S. patent application Ser. No. 12/163,991, filed on Jun. 27, 2008, the entire disclosure of which is incorporated by reference herein.

BACKGROUND

Users are able to access and/or obtain media content digitally, such as through subscription and pay-per-view services. Digital media content that is available from a content distribution service is licensed for security and to protect it from unauthorized sharing, copying, and/or distribution of the media content. Digital rights to restrict the use of media content can be in the form of a license that is associated with the media content.

In a digital rights management (DRM) system, various devices that obtain or download digital media content can perform actions on the protected media content as permitted by a DRM license. For example, the various devices can include any type of portable communication device, mobile phone, music device, or television client device which can perform actions such as to render, playback, copy, print, execute, consume, and/or other actions on the protected media content. The DRM license provides the rights and restrictions of the actions performed on the protected media content.

SUMMARY

This summary is provided to introduce simplified concepts of segmented media content rights management. The simplified concepts are further described below in the Detailed Description. This summary is not intended to identify essential features of the claimed subject matter, nor is it intended for use in determining the scope of the claimed subject matter.

Segmented media content rights management is described. In embodiment(s), a media device can receive segments of protected media content from media content streams that each include a different version of the protected media content. A media content file can be generated to include the segments of the protected media content that are sequenced to render the protected media content for viewing. A file header object can be instantiated in a file header of the media content file, where the file header object includes DRM-associated features, such as one or more DRM licenses, properties, and/or attributes that correspond to the media content file to provision all of the segments of the protected media content together.

In other embodiment(s), segments of the protected media content that are received as different versions of the protected media content can be identified, and then replaced with replacement segments that are a same version of the protected media content. The media content file can then be generated to include the replacement segments that are the same version of the protected media content. The replacement segments that are the same version of the protected media content and included in the media content file can also be provisioned by one or more DRM licenses that are included in the file header object. A segment of protected media content in the media content file can include a segment header and corresponding segment data that together form a file fragment. A file fragment can include one or more track objects where each track object includes additional DRM-associated features that correspond to the file fragment.

In other embodiment(s), a content distributor can distribute segments of protected media content from media content streams that each include a different version of the protected media content. The segments of the protected media content can then be sequenced in a media content file to render the protected media content for viewing at a media device. A license server can provide DRM-associated features, such as one or more DRM licenses, properties, and/or attributes that are included with a file header object in a file header of the media content file. The DRM-associated features correspond to the media content file to provision all of the segments of the protected media content together.

BRIEF DESCRIPTION OF THE DRAWINGS

Embodiments of segmented media content rights management are described with reference to the following drawings. The same numbers are used throughout the drawings to reference like features and components.

DETAILED DESCRIPTION

Embodiments of segmented media content rights management provide that a media device, such as a television client device or portable music device, can receive segments of protected media content from media content streams that each include a different version of the same media content. The different versions of the same media content (e.g., a movie) can be distributed with varying parameters, such as different resolutions, quality, bit rate, and the like. For example, a movie may be distributed from a content distributor in several different versions, or formats, to accommodate the different rendering capabilities of the various types of media devices that a consumer or subscriber utilizes to watch the movie. The movie can be distributed in high-definition for a television client device that can render high-definition video for display on an HDTV, for example. The movie can also be distributed in standard-definition for processing and display on a portable computer, for example. In addition, the movie can be distributed in a low-definition or other minimal resolution format for display on a portable hand-held device.

A content distributor can segment the different media content streams at a uniform interval across all of the different media content streams, such as in two-second "slices", which may be referred to as segmented streaming. A client device or media device can then acquire or receive segments of the media content from any of the different media content streams. For example, a laptop computer may be connected via a cable modem to receive segments of a movie in high-definition from a media content stream. While watching the movie, a user may then move outside and connect the laptop computer wirelessly to continue watching the movie. Because of a decrease in available bandwidth, the laptop computer can continue to receive segments of the movie in standard-definition from a different media content stream. If the signal degrades further, the laptop computer can then continue to receive segments of the movie in a low-definition format from yet another different media content stream. The media device (e.g., the laptop computer in this example) will then have received segments of the protected media content (e.g., the movie) in different versions from any number of the different media content streams.

In various embodiments described herein, a media content file can be generated at the media device that includes the segments of the protected media content from the different media content streams. The segments are sequenced in the media content file to render the protected media content for viewing as a contiguous file. To preclude having to obtain or acquire a multitude of digital rights management (DRM) keys, or having different DRM licenses for each different segment and/or stream of protected media content, a file header object can be instantiated in a file header of the media content file, and the file header object includes DRM-associated features, such as one or more DRM licenses, properties, attributes, and/or other information that corresponds to the media content file to provision all of the segments of the protected media content together. The media device can then seamlessly render all of the segments of a movie without managing a multitude of DRM licenses for the different versions of the media content segments.

When a media device has obtained all of the segments of the protected media content, such as a movie, the media device can save the protected media content and/or communicate the media content file to another device as a renderable file. In other embodiments, the segments of the protected media content that are received as different versions of the protected media content can be identified, and then replaced with replacement segments that are a same version of the protected media content. For example, the standard-definition and low-definition segments of media content can be replaced with high-definition segments of the media content. In another example, the segments of the protected media content that are the different versions can be replaced with a least number of replacement segments.

The media content file can then be generated (e.g., re-generated, updated, etc.) to include the replacement segments that are the same version of the protected media content. The replacement segments can all be the same version of the protected media content and included in the media content file. The replacement segments can also be provisioned by the DRM-associated features, such as one or more DRM licenses, properties, attributes, and/or other information that is included in the file header object.

While features and concepts of the described systems and methods for segmented media content rights management can be implemented in any number of different environments, systems, and/or various configurations, embodiments of segmented media content rights management are described in the context of the following example systems and environments.

Figure 1:
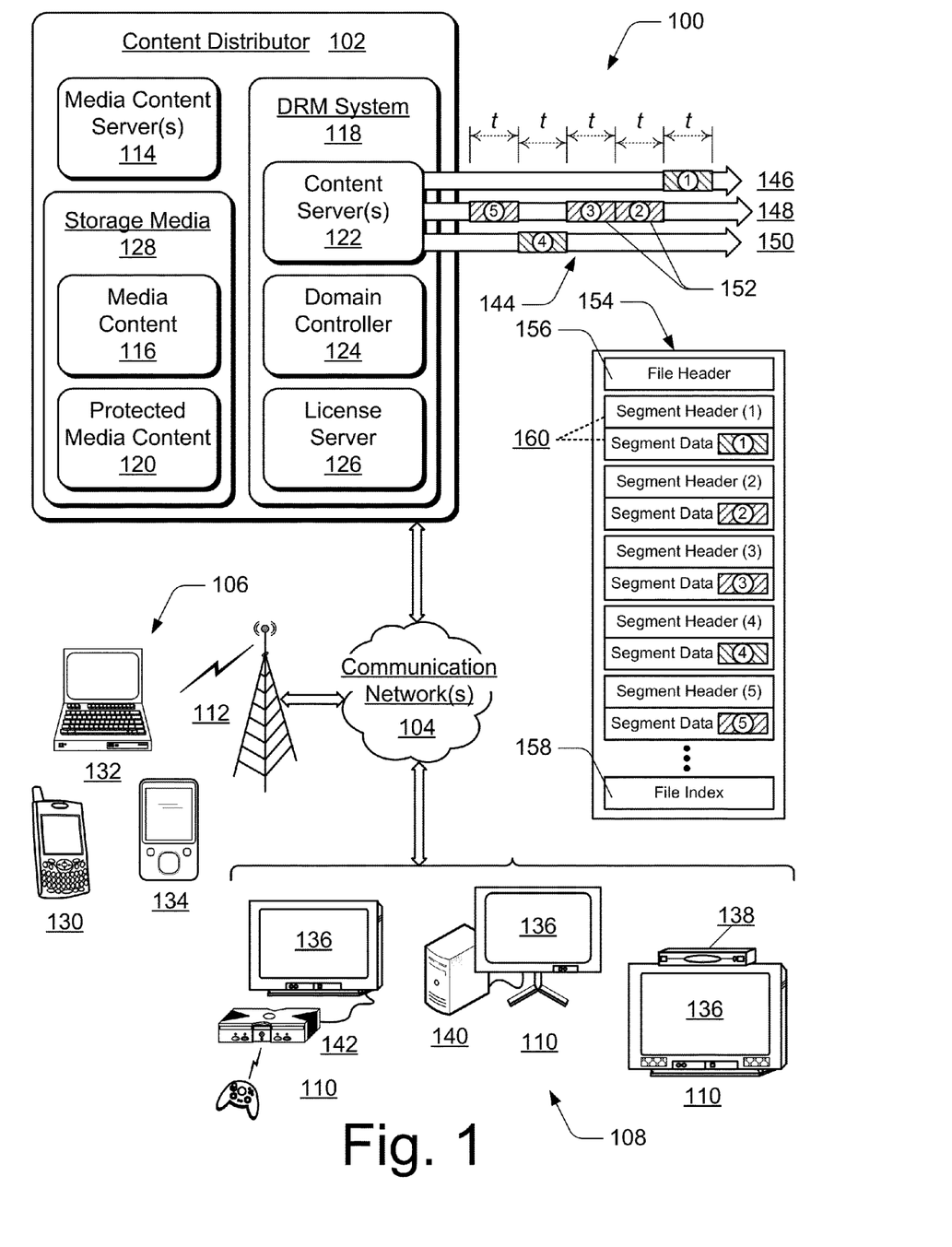
FIG. 1 illustrates an example system in which embodiments of segmented media content rights management can be implemented.

FIG. 1 illustrates an example system 100 in which various embodiments of segmented media content rights management can be implemented. In this example, system 100 includes a content distributor 102 that communicates or otherwise provides media content to any number of various media devices via communication network(s) 104. The various media devices can include wireless media devices 106 as well as other media devices 108 (e.g., wired and/or wireless client devices) that are implemented as components in various client systems 110. In a media content distribution system, the content distributor 102 facilitates the distribution of media content, protected media content, content metadata, and/or other associated data to multiple viewers, users, customers, subscribers, viewing systems, and devices.

The communication network(s) 104 can be implemented to include any type of data network, voice network, broadcast network, an IP-based network, a wide area network (e.g., the Internet), and/or a wireless communications network 112 that facilitates media content distribution, as well as data and/or voice communications between the content distributor 102 and any number of the various media devices. The communication network(s) 104 can also be implemented using any type of network topology and/or communication protocol, and can be represented or otherwise implemented as a combination of two or more networks. Any one or more of the arrowed communication links facilitate two-way communications, such as from the content distributor 102 to a media device 108 (e.g., a television client device) and vice-versa.

The content distributor 102 can include media content servers 114 that are implemented to receive media content for distribution to subscriber media devices. The content distributor 102 can receive media content 116 from various content sources, such as a content provider, an advertiser, a national television distributor, and the like. The content distributor 102 can communicate or otherwise distribute media content 116 and/or other data to any number of the various wireless media devices 106 and other media devices 108.

The media content 116 (e.g., to include recorded media content) can include any type of audio, video, and/or image media content received from any type of media content source. As described throughout, "media content" can include television programs (or programming), advertisements, commercials, music, movies, video clips, and on-demand media content. Other media content can include interactive games, network-based applications, and any other audio, video, and/or image content (e.g., to include program guide application data, user interface data, advertising content, closed captions data, content metadata, search results and/or recommendations, and the like).

In this example, the content distributor 102 includes a digital rights management (DRM) system 118 that can encrypt the media content 116 to form protected media content 120. The protected media content 120 can include any type of media content that is purchased, downloaded, or otherwise obtained, such as music, a movie, an application, a game, pictures, a video clip, and the like. The DRM system 118 includes content server(s) 122 that distribute the protected media content 120 to the various wireless media devices 106 and other media devices 108. The DRM system 118 also includes a domain controller 124 and a license server 126.

The domain controller 124 can manage device membership in a domain and issue domain certificates and private keys to devices that are members of the domain. The domain controller 124 can maintain a current list of media devices that are part of a particular user's domain, as well as the public and private key pairs that have issued for the domain. The license server 126 can issue DRM licenses which provision the rights and restrictions of actions performed on the protected media content 120 by the various media devices. In an implementation, the domain controller 124 and the license server 126 can be managed by separate entities, or can be implemented together in a domain. Although the content servers 122, domain controller 124, and license server 126 are described as distributed, independent components of the DRM system 118, any one or more of the server(s) and controller(s) can be implemented together as a multi-functional component or entity of the system. In various implementations, domain membership can also be managed by a network operator, a third party entity, or by a user.

In this example, the content distributor 102 also includes storage media 128 to store or otherwise maintain various data and media content, such as media content 116, protected media content 120, media content metadata, and/or subscriber information. The storage media 128 can be implemented as any type of memory, random access memory (RAM), read only memory (ROM), any type of magnetic or optical disk storage, and/or other suitable electronic data storage. In addition, content distributor 102 can be implemented with any number and combination of differing components as further described with reference to the example device shown in FIG. 4.

The wireless media devices 106 can include any type of device implemented to receive and/or communicate wireless data and voice communications, such as any one or combination of a mobile phone 130 (e.g., cellular, VoIP, WiFi, etc.), a portable computer device 132, a media device 134 (e.g., a personal media player, portable media player, etc.), and/or any other wireless media device that can receive media content in any form of audio, video, and/or image data. Each of the client systems 110 include a respective client device and display device 136 that together render or playback any form of audio, video, and/or image content, media content, protected media content, and/or television content.

A display device 136 can be implemented as any type of a television, high definition television (HDTV), LCD, or similar display system. A client device in a client system 110 can be implemented as any one or combination of a television client device 138 (e.g., a television set-top box, a digital video recorder (DVR), etc.), a computer device 140, a gaming system 142, an appliance device, an electronic device, and/or as any other type of client device that can be implemented to receive television content or media content in any form of audio, video, and/or image data in a media content distribution system.

Any of the wireless media devices 106 and/or other media devices 108 can be implemented with one or more processors, communication components, memory components, signal processing and control circuits, a DRM platform, and a media content rendering system. A media device may also be associated with a user or viewer (i.e., a person) and/or an entity that operates the device such that a media or client device describes logical devices that include users, software, and/or a combination of devices.

In this example system 100, the content server(s) 122 of the DRM system 118 distribute the protected media content 120 to the various wireless media devices 106 and other media devices 108 as media content streams 144 that each include a different version of the same protected media content. For example, a movie that is subject to DRM can be distributed with varying parameters, such as different resolutions, quality, bit rate, and the like. The movie can be distributed by the content server(s) 122 in several different versions, or formats, to accommodate the different rendering capabilities of the various types of wireless media devices 106 and other media devices 108. The protected media content 120 can be distributed in high-definition with media content stream 146 for television client device 138 that can render high-definition video for display on an HDTV (e.g., display device 136). The protected media content 120 can also be distributed in standard-definition with media content stream 148 for processing and display on portable computer device 132. In addition, the protected media content 120 can also be distributed with media content stream 150 in a low-definition or other minimal resolution format for display on a portable hand-held media device 134.

The content distributor 102, or a component or system thereof, can segment the different media content streams at a uniform interval "t" (e.g., time in this example) across all of the different media content streams 144, such as in two-second "slices", which may be referred to as segmented streaming. A media device can then acquire or receive segments 152 of the protected media content 120 from any of the different media content streams 144. For example, the portable computer device 132 may be connected via a cable modem to receive segments (e.g., "segment 1") of a movie in high-definition from media content stream 146.

While watching the movie, a user may then move outside and connect the portable computer device 132 wirelessly to continue watching the movie. Because of a decrease in available bandwidth, the computer device 132 can continue to receive segments (e.g., "segments 2-3") of the movie in standard-definition from a different media content stream 148. If the signal degrades further, the computer device 132 can then continue to receive segments (e.g., "segment 4") of the movie in a low-definition format from yet another different media content stream 150. If the signal improves, the computer device 132 can continue to receive segments (e.g., "segment 5") of the movie in standard-definition from the media content stream 148, and so on. The media device (e.g., the portable computer device in this example) will then have received segments of the protected media content 120 in different versions from any number of the different media content streams 144.

In one or more embodiments, a media content file 154 can be generated at the media device that receives the various segments of the protected media content 120. The media content file 154 includes a file header 156, a file index 158, and multiple file fragments 160 that are formed by a segment header and corresponding segment data. For example, segment header "1" and corresponding segment data "1" together form file fragment 160 which includes the "segment 1" of the protected media content 120 in high-definition from media content stream 146. The segments 1-5 et al. from the different media content streams 144 of protected media content 120 are sequenced in the media content file 154 to render the protected media content for viewing as a contiguous file. The media content file 154 is further described with reference to the media content file shown in FIG. 2.

Figure 2:
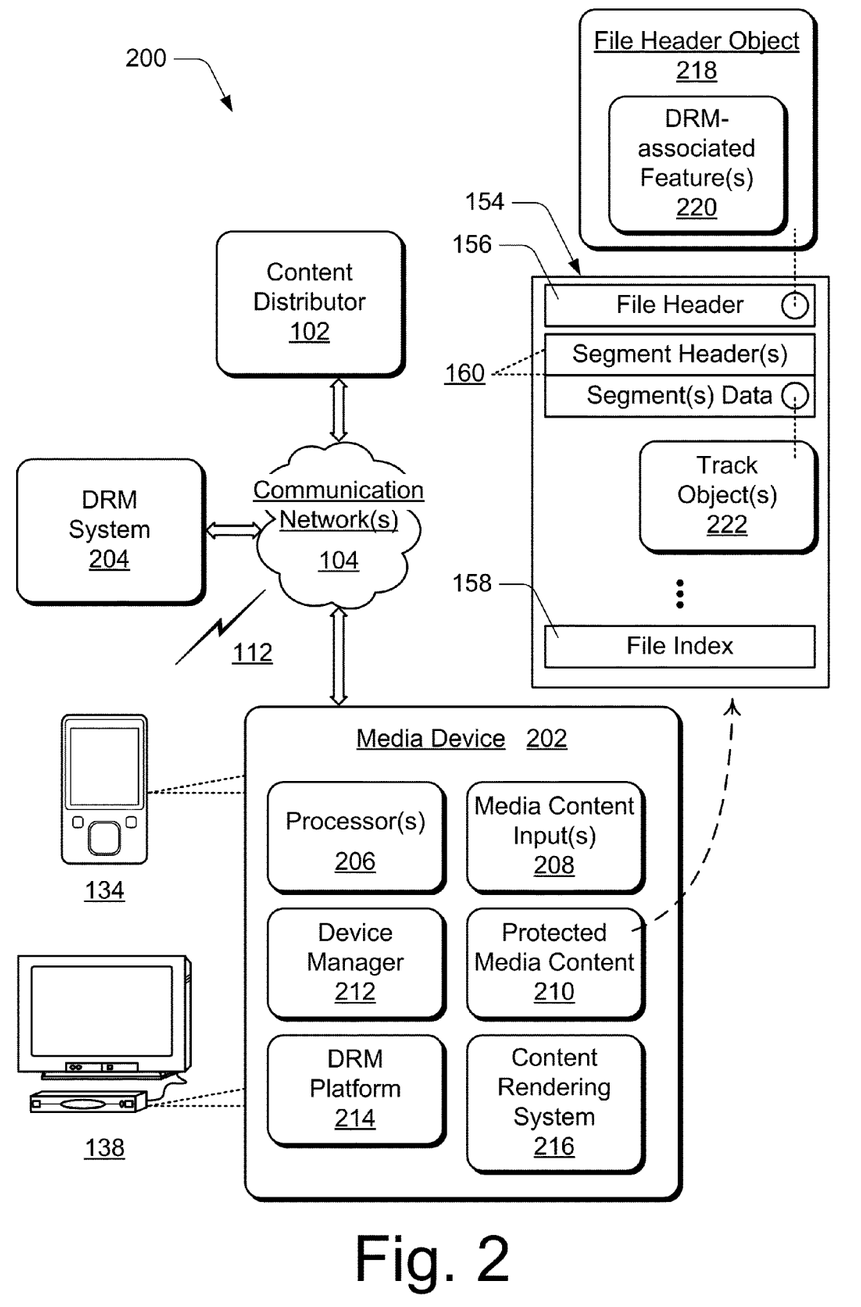
FIG. 2 illustrates another example system in which embodiments of segmented media content rights management can be implemented.

FIG. 2 illustrates an example system 200 in which various embodiments of segmented media content rights management can be implemented. In this example, system 200 includes the content distributor 102 and an example of a wired and/or a wireless media device 202, such as portable media device 134 and television client device 138 as described with reference to FIG. 1. System 200 also includes an example of a DRM system 204 that is implemented apart from the content distributor 102 (e.g., on a separate server or as a third-party service) which can implement the various embodiments described herein. The content distributor 102, DRM system 204, and media device 202 can all be implemented for communication with each other via the communication network(s) 104 and/or the wireless communications network 112.

Media device 202 can be implemented with processing, communication, and memory components, as well as signal processing and control circuits. Media device 202 may also be associated with a user or owner (i.e., a person) and/or an entity that operates the device such that a media device describes logical devices that include users, software, and/or a combination of devices. In this example, the media device 202 includes one or more processors 206 (e.g., any of microprocessors, controllers, and the like), media content inputs 208, and protected media content 210 (e.g., received media content, media content that is being received, recommended media content, recorded media content, etc.). The media content inputs 208 can include any type of wireless, broadcast, and/or over-the-air inputs via which media content and/or protected media content is received.

Media device 202 can also include a device manager 212 and/or DRM platform 214 (e.g., a control application, software application, signal processing and control module, etc.) that can be implemented as computer-executable instructions and executed by the processors 206 to implement various embodiments and/or features of segmented media content rights management as described herein. Media device 202 can also include a content rendering system 216 to receive and render the protected media content 210. In addition, media device 202 can be implemented with any number and combination of differing components as further described with reference to the example device shown in FIG. 4.

Media device 202 can itself include a removable component that is associated with a DRM license (e.g., the DRM license is cryptographically bound to the removable component). The removable component can be a token of the media device 202, and the DRM license is cryptographically bound to the token of the device. The removable component can be implemented as a flash card, a Subscriber Identity Module (SIM) card, as a smart card, and/or as any other type of token of the media device 202 that is associated with the DRM license. The removable component can include a USIM (User Subscriber Identity Module) which is a logical entity on a card to store subscriber and/or authentication information. For example, the DRM license may have various, associated license identifiers, such as a customer identifier, service identifier, and/or a domain identifier that, in any combination, authenticate the media device 202 to a domain controller and/or to a license server of a DRM system and/or segmented media content rights management. The DRM license provides the rights and restrictions of the actions performed on the protected media content 210, such as to render, playback, copy, print, execute, consume, and/or other actions on the protected media content.

System 200 also includes the media content file 154 described as an example of the protected media content 210, and as described with reference to FIG. 1. To preclude having to obtain or acquire a multitude of digital rights management (DRM) keys, or having different DRM licenses for each different segment and/or stream of protected media content, a file header object 218 can be instantiated in the file header 156 of the media content file 154, and the file header object 218 includes DRM-associated features 220, such as one or more DRM licenses, properties, attributes, and/or other information that corresponds to the media content file 154 to provision all of the segments of the protected media content together. The media device 202 can then seamlessly render all of the segments of a movie, for example, without managing a multitude of DRM licenses for the different versions of the media content segments.

In addition, a file fragment that is formed by a segment header and corresponding segment data, such as file fragment 160, includes one or more track objects 222. Each track object can also include DRM-associated features, such as one or more DRM licenses, properties, attributes, and/or other information that is included in a track object. A file fragment 160 can include or be associated with an audio track, a video track, and/or a combination thereof, and a track object 222 corresponds to the audio track, video track, or combination of audio track(s) and/or video track(s) of a file fragment.

When the media device 202 has obtained all of the segments of the protected media content 210, such as a movie, the media device can save the protected media content and/or communicate the media content file 154 to another device as a renderable file. In one or more embodiments, the segments of the protected media content 210 that are received as different versions of the protected media content can be identified, and then replaced with replacement segments that are a same version of the protected media content. For example, the standard-definition and low-definition segments of media content can be replaced with high-definition segments of the media content. In another example, the segments of the protected media content that are the different versions can be replaced with a least number of replacement segments.

The DRM platform 214 and/or the content rendering system 216 can then generate (e.g., re-generated, updated, etc.) the media content file 154 to include the replacement segments that are the same version of the protected media content. The replacement segments call all be the same version of the protected media content and included in the media content file. The replacement segments can also be provisioned by the DRM-associated features, such as one or more DRM licenses, properties, attributes, and/or other information that is included in the file header object.

The file header object 218 can be implemented as a DRM object and include file-level properties that are common for the various segments of the protected media content. In an implementation, a file header object can include:

| Field Name | Field Type | Field Description |
| --- | --- | --- |
| Size | unsigned int(32) | Size of the Box |
| Type | unsigned int(32) | Type of Box (4CC) |
| Usertype | unsigned int(8)[16] | Type of Box (GUID) |
| Version | unsigned int(8) | Version of Box definition |
| Flags | unsigned int(24) | Bit field of flags |
| DataSize | unsigned int(32) | Specifies the size in bytes of the Data field. |
| Data | unsigned int(8) | The content protection data for the object. |

A track object 222 can also be implemented as a DRM object and include DRM properties and attributes for a particular file fragment. A track object can contain information to decrypt elementary streams (e.g., streams that are divided up into sequences of samples called encryption runs). An encryption run can shares the same encryption algorithm, mode, and key. The encryption algorithm and mode can be expressed as indexes into tables. In one instance, the encryption algorithm index is 0 (i.e., "zero"), which indicates that the encryption run is not encrypted. In an implementation, a track object can include:

| Field Name | Field Type | Field Description |
| --- | --- | --- |
| Size | unsigned int(32) | Size of the Box |
| Type | unsigned int(32) | Type of Box (4CC) |
| Usertype | unsigned int(8)[16] | Type of Box (GUID) |
| Version | unsigned int(8) | Version of Box definition |
| Flags | unsigned int(24) | Bit field of flags |
| EncryptionRun | unsigned int(8) | Number of runs in fragment |
| AlgorithmID | unsigned int(4) | Index into encryption algorithm table |
| ModeID | unsigned int(4) | Index into encryption mode table |
| KID | unsigned int(8)[16] | Key ID for the key used to encrypt the run |

-continued

| Field Name | Field Type | Field Description |
|---|---|---|
| SampleCount | unsigned int(32) | Number of samples in run |
| SampleID | unsigned int(64) | First sample Id of run |

An algorithm defined for a track object is AES with algorithm ID=0x1 and the mode defined is counter mode with Mode ID=0x1. In a case where the algorithm ID=0x0, the entire run of samples is not encrypted and the Mode Id is 0x0 and KID is all zeros.

Example method 300 is described with reference to FIG. 3 in accordance with one or more embodiments of segmented media content rights management. Generally, any of the functions, methods, procedures, components, and modules described herein can be implemented using hardware, software, firmware, fixed logic circuitry, manual processing, or any combination thereof. A software implementation of a function, method, procedure, component, or module represents program code that performs specified tasks when executed on a computing-based processor. Example method 300 may be described in the general context of computer-executable instructions. Generally, computer-executable instructions can include software, applications, routines, programs, objects, components, data structures, procedures, modules, functions, and the like.

The method(s) may also be practiced in a distributed computing environment where functions are performed by remote processing devices that are linked through a communication network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 3:
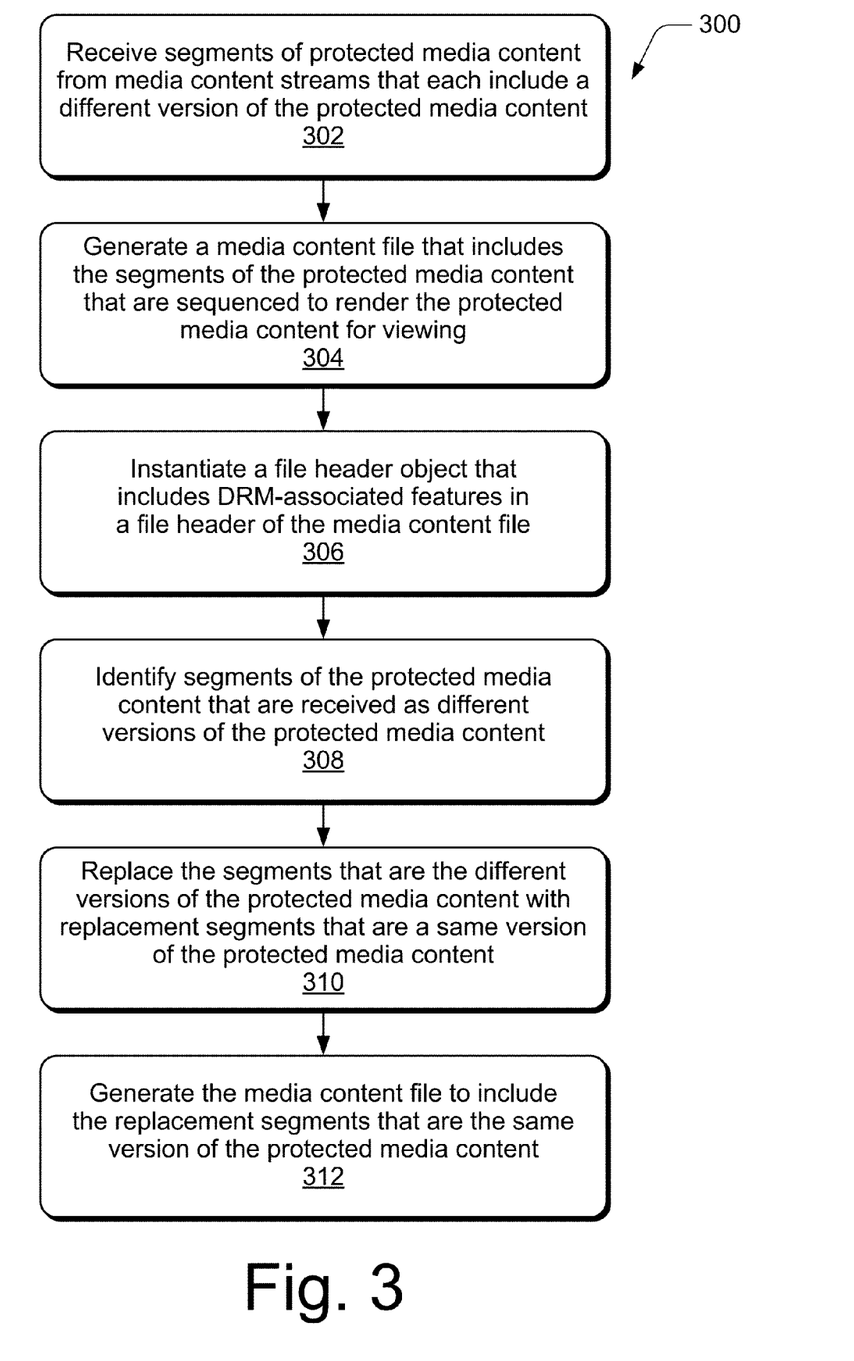
FIG. 3 illustrates example method(s) for embodiments of segmented media content rights management.

FIG. 3 illustrates example method(s) 300 of segmented media content rights management, and is described with reference to a media device that receives segmented, protected media content. The order in which the method is described is not intended to be construed as a limitation, and any number of the described method blocks can be combined in any order to implement the method, or an alternate method.

At block 302, segments of protected media content are received from media content streams that each include a different version of the protected media content. For example, media device 202 receives segments 152 of protected media content 120 from media content streams 144 that each include a different version of the protected media content.

At block 304, a media content file is generated that includes the segments of the protected media content that are sequenced to render the protected media content for viewing. For example, content rendering system 216 at media device 202 generates media content file 154 that includes the segments 152 of the protected media content 120 that are sequenced to render the protected media content for viewing. In an embodiment, a segment of protected media content in the media content file 154 includes a segment header and corresponding segment data that together form a file fragment 160 which includes one or more track objects 222. Each of the track objects 222 can include DRM-associated features, such as one or more DRM licenses, properties, attributes, and/or other information that corresponds to the file fragment. A file fragment 160 can include an audio track, a video track, and/or a combination thereof, and a track object 222 corresponds to the audio track, video track, or combination of audio track(s) and/or video track(s) of the file fragment.

At block 306, a file header object is instantiated in a file header of the media content file and includes DRM-associated features that correspond to the media content file. For example, DRM platform 214 at media device 202 instantiates file header object 218 in the file header 156 of the media content file 154, and the file header object 218 includes one or more DRM-associated features that correspond to the media content file. The file header object 218 can include the one or more DRM-associated features, such as one or more DRM licenses, properties, attributes, and/or other information to provision all of the segments of the protected media content together in the media content file.

At block 308, segments of the protected media content are identified that are received as different versions of the protected media content. For example, the content rendering system 216 at media device 202 identifies the segments of the protected media content that are received as different versions of the protected media content. At block 310, the segments that are the different versions of the protected media content are replaced with replacement segments that are a same version of the protected media content. For example, the content rendering system 216 replaces the segments that are the different versions of the protected media content with replacement segments that are a same version of the protected media content.

At block 312, the media content file is generated to include the replacement segments that are the same version of the protected media content. For example, the content rendering system 216 generates the media content file 154 to include the replacement segments that are the same version of the protected media content. The replacement segments that are the same version of the protected media content are provisioned by one or more DRM licenses that are associated with the media content file and included in the file header object.

Figure 4:
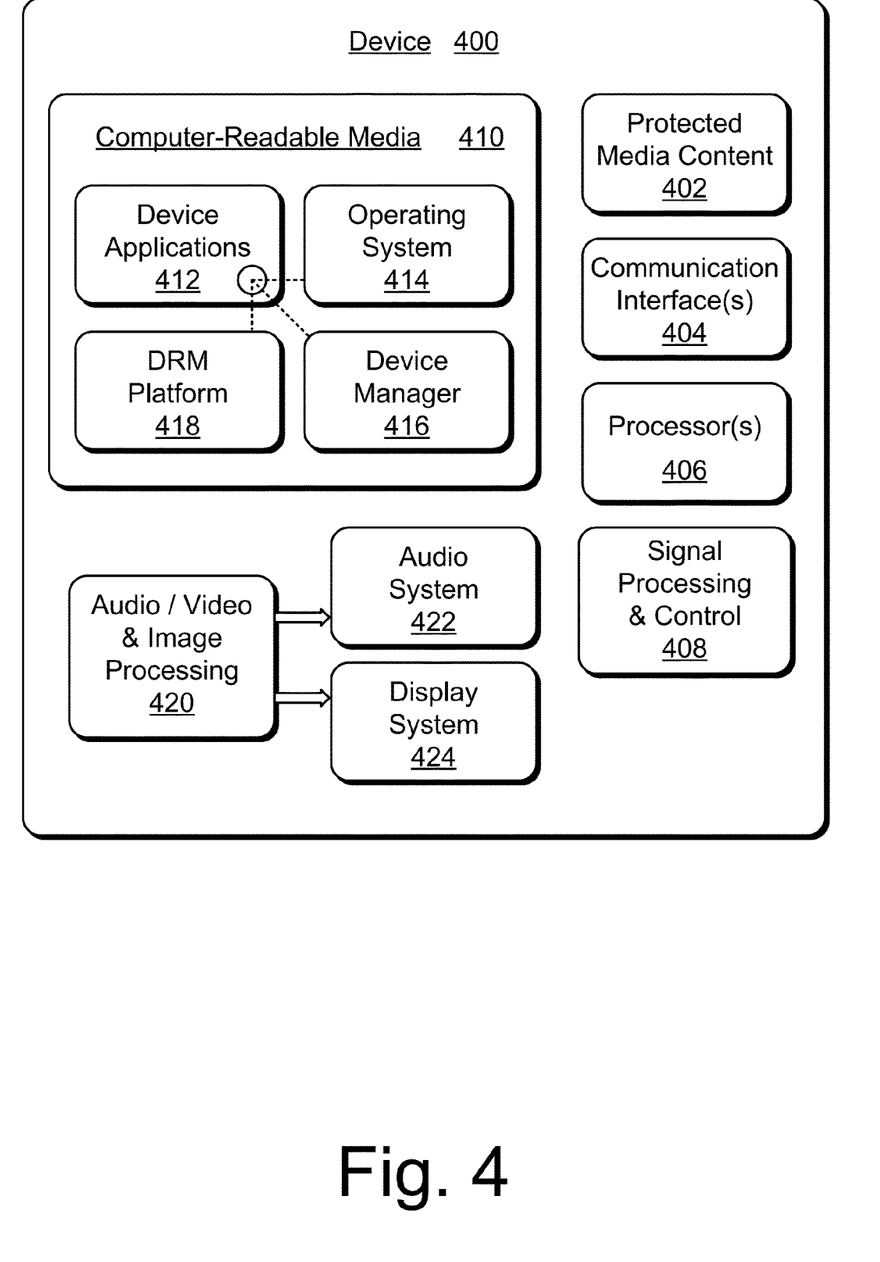
FIG. 4 illustrates various components of an example device that can implement embodiments of segmented media content rights management.

FIG. 4 illustrates various components of an example device 400 that can be implemented as any form of a communication, computing, electronic, and/or media device to implement various embodiments of segmented media content rights management. For example, device 400 can be implemented as a computer device, server device, media device, content distributor, and/or as a DRM system as shown in FIG. 1 and/or FIG. 2.

Device 400 includes protected media content 402 and one or more communication interfaces 404 that can be implemented for any type of data and/or voice communication via communication network(s). Device 400 also includes one or more processors 406 (e.g., any of microprocessors, controllers, and the like) which process various computer-executable instructions to control the operation of device 400, and to implement embodiments of segmented media content rights management. Alternatively or in addition, device 400 can be implemented with any one or combination of hardware, firmware, or fixed logic circuitry that is implemented in connection with signal processing and control circuits which are generally identified at 408.

Device 400 also includes computer-readable media 410, such as one or more memory components, examples of which include a removable card, SIM card, random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), any type of a digital versatile disc (DVD), and the like.

Computer-readable media 410 provides data storage mechanisms to store the protected media content 402, as well as various device applications 412 and any other types of information and/or data related to operational aspects of device 400. For example, an operating system 414 can be maintained as a computer application with the computer-readable media 410 and executed on the processors 406. The device applications 412 can also include a device manager 416 and a DRM platform 418 that can implemented as a component of the device and configured to implement the DRM techniques described herein. In this example, the device applications 412 are shown as software modules and/or computer applications that can implement various embodiments of segmented media content rights management as described herein.

Device 400 can also include an audio, video, and/or image processing system 420 that provides audio data to an audio rendering system 422 and/or provides video or image data to an external or integrated display system 424. The audio rendering system 422 and/or the display system 424 can include any devices or components that process, display, and/or otherwise render audio, video, and image data. In an implementation, the audio rendering system 422 and/or the display system 424 can be implemented as integrated components of the example device 400. Although not shown, device 400 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Although embodiments of segmented media content rights management have been described in language specific to features and/or methods, it is to be understood that the subject of the appended claims is not necessarily limited to the specific features or methods described. Rather, the specific features and methods are disclosed as example implementations of segmented media content rights management.

The invention claimed is:

1. A computer storage device having computer-executable instructions stored thereon that, responsive to execution by a processor, perform a method comprising:
   receiving segments of protected media content from media content streams, each media content stream including a different version of the same protected media content;
   generating a media content file that includes the received segments of the protected media content that are sequenced to render the protected media content for viewing as a contiguous file, the contiguous file including at least two segments that are different versions of the same protected media content; and
   instantiating a single file header object in a file header of the media content file, the single file header object including DRM-associated features that correspond to the different versions of the same protected media content in the media content file to provision all of the segments of the protected media content together.

2. The computer storage device as recited in claim 1, wherein the different versions of the same protected media content comprise protected media content with different resolutions, different quality, or different bit rates.

3. The computer storage device as recited in claim 1, wherein the different versions of the same protected media content comprise protected media content with different standards for rendering the protected media content.

4. The computer storage device as recited in claim 1, wherein the protected media content comprises video content, and wherein the segments of the protected media content include at least two of a high-definition video segment, a standard-definition video segment, or a low-definition video segment.

5. The computer storage device as recited in claim 1, wherein a segment of protected media content in the media content file includes a segment header and corresponding segment data that together form a file fragment which includes one or more track objects, each track object including additional DRM-associated features that correspond to the file fragment.

6. The computer storage device as recited in claim 5, wherein the file fragment includes at least one of an audio track or a video track, and wherein a track object corresponds to at least one of the audio track or the video track.

7. The computer storage device as recited in claim 1, wherein the DRM-associated features include one or more DRM licenses in the single file header object to provision all of the segments of the protected media content together in the media content file.

8. The computer storage device as recited in claim 1, wherein the computer-executable instructions, responsive to execution by the processor, perform a method further comprising:
   identifying segments of the protected media content that are received as different versions of the same protected media content;
   replacing the segments that are the different versions of the same protected media content with replacement segments that are a same version of the protected media content; and
   generating the media content file to include the replacement segments that are the same version of the protected media content.

9. The computer storage device as recited in claim 1, wherein the replacement segments that are the same version of the protected media content are provisioned by one or more DRM licenses that are associated with the media content file and included in the single file header object.

10. A method comprising:
    distributing segments of protected media content from media content streams that each include a different version of the same protected media content, the segments of the protected media content being sequenced in a media content file to render the protected media content for viewing at a media device as a single contiguous file that includes at least two segments that are different versions of the same protected media content; and
    providing DRM-associated features that are included with a single file header object in a file header of the media content file, the DRM-associated features corresponding to the different versions of the same protected media content in the media content file to provision all of the segments of the protected media content together.

11. The method as recited in claim 10, wherein the different versions of the same protected media content comprise protected media content with different resolutions, different quality, or different bit rates.

12. The method as recited in claim 10, wherein the different versions of the same protected media content comprise protected media content with different standards for rendering the protected media content.

13. The method as recited in claim 10, wherein the protected media content comprises video content, and wherein the segments of the protected media content include at least two of a high-definition video segment, a standard-definition video segment, or a low-definition video segment.

14. The method as recited in claim 10, wherein the DRM-associated features include one or more DRM licenses in the single file header object to provision all of the segments of the protected media content together in the media content file.

15. The method as recited in claim 10, wherein a segment of protected media content includes a segment header and corresponding segment data that together form a file fragment which includes one or more track objects, each track object including additional DRM-associated features that correspond to the file fragment.

16. The method as recited in claim 15, wherein the file fragment includes at least one of an audio track or a video track, and wherein a track object corresponds to at least one of the audio track or the video track.

17. The method as recited in claim 10, further comprising receiving a request to replace the segments that are different versions of the same protected media content with replacement segments that are a same version of the protected media content in the media content file.

18. The method as recited in claim 17, wherein the replacement segments that are the same version of the protected media content are provisioned by one or more DRM licenses that are associated with the media content file and included in the single file header object.

19. The method as recited in claim 17, wherein a version of the protected media content correlates to a standard for rendering the protected media content, and wherein the replacement segments that are the same version of the protected media content correlate to the same standard for rendering the protected media content.

20. A system comprising:
one or more processors; and
one or more memory devices storing program instructions that are executable by the one or more processors to perform operations comprising:
  receiving first segments of video content in a standard-definition format from a first video content stream;
  receiving second segments of the same video content in a lower-definition format from a second video content stream responsive to a decrease in available bandwidth;
  receiving third segments of the same video content in a higher-definition format from a third video content stream responsive to an increase in available bandwidth;
  generating a media content file that includes at least two of a first segment of the video content in the standard-definition format, a second segment of the same video content in the lower-definition format, and a third segment of the same video content in the higher-definition format, the at least two of the first segment, the second segment, and the third segment sequenced to render the protected media content for viewing as a contiguous file; and
  instantiating a single file header object in a file header of the media content file, the single file header object including DRM-associated features that correspond to the different formats of the same video content in the media content file to provision all of the segments in the protected media content together.

* * * * *